United States Patent [19]

Tsujimoto

[11] 4,024,551
[45] May 17, 1977

[54] ELECTRIC SHUTTER CAMERA

[75] Inventor: Kayoshi Tsujimoto, Osaka, Japan

[73] Assignee: Minolta Camera Kabushiki Kaisha, Osaka, Japan

[22] Filed: Aug. 1, 1975

[21] Appl. No.: 600,981

[30] Foreign Application Priority Data

Aug. 29, 1974 Japan .............. 49-99699

[52] U.S. Cl. .................... 354/51; 354/209; 354/204
[51] Int. Cl.² .................. G03B 19/02; G03B 17/42
[58] Field of Search .......... 354/204, 206, 207, 208, 354/209, 173, 51, 205

[56] References Cited

UNITED STATES PATENTS

| | | | |
|---|---|---|---|
| 3,611,900 | 10/1971 | Kitai | 354/207 |
| 3,705,338 | 12/1972 | Tsujimoto et al. | 354/204 X |
| 3,754,455 | 8/1973 | Tsujimoto et al. | 354/173 |
| 3,759,156 | 10/1973 | Kobou | 354/206 X |
| 3,763,755 | 10/1973 | Kuramoto | 354/173 |
| 3,820,141 | 6/1974 | Aizawa | 354/206 X |
| 3,882,516 | 5/1975 | Ogiso et al. | 354/173 |
| 3,909,835 | 9/1975 | Ito et al. | 354/204 |

Primary Examiner—Edna M. O'Connor
Attorney, Agent, or Firm—Wolder & Gross

[57] ABSTRACT

A double-exposure proof camera includes a manual film advance and a solenoid which opens and closes the shutter with energization and de-energization of the solenoid. The solenoid is connected through a thyrister and a semi-conductor switch to a battery, the semi-conductor switch being closed and opened at the initiation and termination of a time interval determined by an RC network whose resistance component is controlled by a scene exposed photosensitive element. The thyrister gate is connected through a series connected pair of switches to a capacitor, one switch being closed with the depression of a shutter release member and the other switch being closed and opened respectively with a film frame being in exposure position and the film frame being advanced to discharge. The capacitor is connected to the battery through a pair of parallel switches, one of which is manually closeable and the other is closed during the advance of the film. A single exposure per film frame is only permitted, except when the manual switch is closed to permit continuous capacitor charging and multiple exposure of a single frame.

8 Claims, 4 Drawing Figures

ELECTRIC SHUTTER CAMERA

BACKGROUND OF THE INVENTION

The present invention relates generally to improvements in electric shutter cameras, and it relates more particularly to an improved electric shutter camera, in which exposure is effected by the excitation of an electromagnet and the transportation or winding of the film for successive exposures are effected by a manual operation.

In general, an electric shutter camera of the subject type, in which exposure is effected by the excitation of an electromagnet or solenoid is provided with a switch which is closed by the depression of a shutter release member, whereby the excitation of the electromagnet is effected due to the closure of the switch. The electric shutter camera of this type, however, suffers from an disadvantage in that if the manual advance or winding of the film for the next successive exposure is performed, then many problems arise. More particularly, if the shutter release member is inadvertently depressed before the manual advance of the film, a full frame or increment, the electromagnet is again excited, so that the film image surface which has been previously subjected to exposure, is again exposed.

Accordingly, for avoiding the aforesaid disadvantages which are experienced with the prior art electric shutter camera of the subject type, there has been proposed a locking member which locks the shutter release member in its retracted position which has been assumed before the depression thereof, for the time duration from the completion of the exposure until the film has been advanced a full frame for the subsequent exposure. However, the provision of the locking member necessitates the use of a release member which detects the completion of the film transportation and releases the shutter release member from its locked condition effected by the locking member, and an actuating member which detects the completion of exposure and moves the locking member to a position where the shutter release member is locked.

As a result, a camera of the above construction requires additional space to house the additional members therein, thus resulting in an increase in the size of a camera and hence resulting in increased bulk and complexity. It is highly convenient if an electric shutter camera permits multi-exposure when desired. However, if the above locking member is used therein, then the aforesaid locking member must cooperate not only with the completion of the film transportation, but also with the switching operation required for multi-exposure, thus resulting in further complications in the mechanism.

SUMMARY OF THE INVENTION

It is accordingly a principal object of the present invention to provide an improved electric shutter camera of the type, in which exposure is commenced by the excitation of an electromagnet or solenoid in response to a shutter releasing operation, and the frame advance of a film for successive exposures is effected by a manual operation, the camera automatically preventing the film whch has been exposed from being again exposed inadvertently, or from being exposed during the period of completion of the frame advance of the film, and obviating the need for the aforesaid locking member mechanism.

It is another object of the present invention to provide an electric shutter camera of the above nature which is of compact and simple construction and which selectively permits multi-exposure of a single frame.

Accordingly, to the present invention, there is provided an electric shutter camera which comprises: a manually operable means for transporting a film to a position for subsequent exposure; an electromagnet or solenoid which is excited in response to the shutter releasing operation and causes the shutter to be driven to its open position; and an electric circuit which prevents the excitation of the electromagnet till completion of the transportation of a film for the subsequent exposure.

As a result, with the improved electric shutter camera, after the completion of the film transportation, an electromagnet is excited in response to the shutter releasing operation for exposure of a film. On the other hand, before the completion of the film transportation, even if the shutter releasing operation is effected, the electromagnet is not excited, and hence any undesired double exposure of a film image surface is automatically prevented. In addition, with an electric shutter camera of the subject type, a mechanical locking member, releasing member and actuating member are replaced by the aforesaid simple electric circuit, with a great economy in space, and hence with the size of the camera being highly compact.

For example, according to a preferred embodiment of the present invention, the aforesaid electric circuit includes: capacitance means; first charging means for charging the capacitance means; discharging means for discharging the capacitance means; and a semi-conductor circuit connected to the electromagnet. The aforesaid capacitance means is charged by means of the first charging means during the transportation or advance of a film, and discharged by means of discharging means in response to the shutter releasing operation after the completion of the film advance or transportation. The aforesaid semi-conductor circuit comprises a thyrister and has its gate terminal connected to the discharging means, so that the semi-conductor circuit is rendered conductive due to the discharge of the capacitance means to permit the excitation of electromagnet. In addition, once the exposure has been completed, then the capacitance means will not be charged or discharged, unless the film is transported to a position for subsequent exposure. Thus, even if a shutter is released, semi-conductor will not be rendered conductive, so that an electromagnet will not be excited.

The electric shutter camera according to the present invention is provided with second charging means for charging the aforesaid capacitance means. The second charging means is connected in parallel with the first charging means and is manually operable, so as to assume a position to charge the capacitance means. Accordingly, when the second charging means is operated so as to assume its operative position, the capacitance means is charged, even if the film is not transported to a given position. Thus, when the shutter releasing operation is effected, the capacitance means is discharged to render the semi-conductor circuit conductive, so that the electromagnet is excited and thus the film is again exposed. As is apparent from the foregoing, the electric shutter camera according to the present invention is of simple construction, having only an additional means such as the second charging means, and yet permits double exposure, thus avoiding complexity in the construction of the camera.

The above and other objects and features of the present invention will be apparent from a reading of the following description taken in conjunction with the accompanying drawings which illustrate a preferred embodiment of the present invention.

DESCRIPTION OF THE PREFERRED EMBODIMENT

Figure 1:
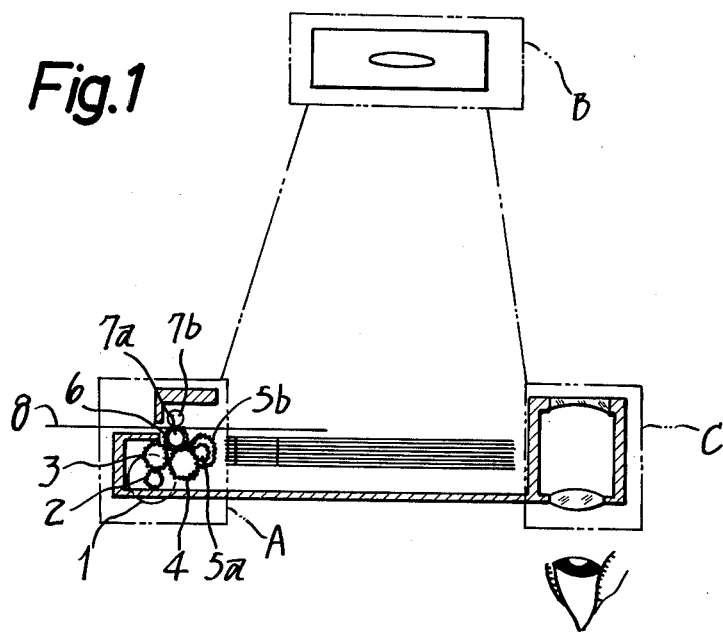
FIG. 1 is a schematic longitudinal cross-sectional view of a self-processing camera embodying the present invention.

Referring now to the drawings which illustrate a preferred embodiment of the present invention as applied to a self processing camera in which exposure is commenced with the excitation of an electromagnet or solenoid which cooperates with the depression of a release member biased to return to its retracted or home position, and a film sheet which has completed exposure is advanced or transported out of the camera by the manual operation of a winding knob, the reference letters A, B and C generally designate a film transport portion, a shutter portion and a finder portion, respectively. The film transport portion A consists of a winding knob 1, which is manually rotatable, a gear train including gears 2, 3, 4, 5a, 5b, 6 and rollers 7a, 7b. Thus, when the winding knob 1 is rotated, the rollers 7a, 7b are rotated by way of the gears 2, 3, 4, 5a, 5b, 6 to thereby advance and discharge an exposed film sheet from the camera.

Figure 2:
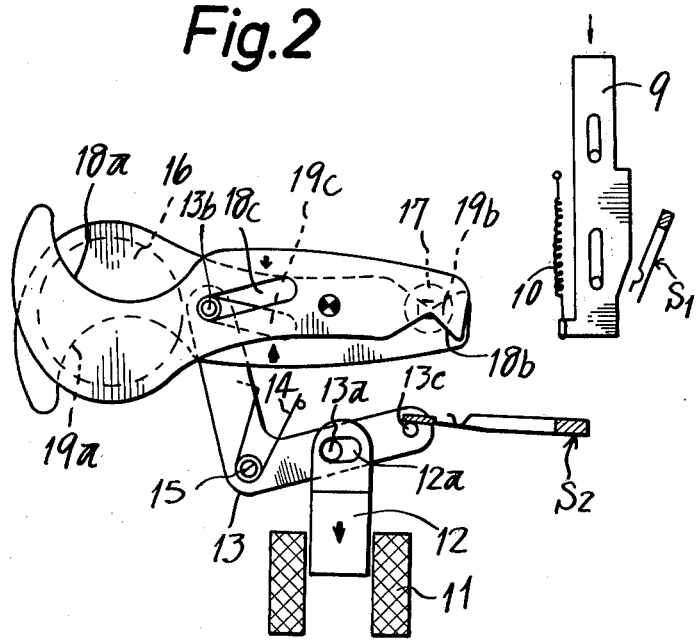
FIG. 2 is an elevational view of shutter mechanism housed in the portion B of the self processing camera of FIG. 1.

Shown at 9 is a release plate which may be depressed against the action or bias of a spring 10 to close a normally open switch $S_1$. An electromagnet or solenoid 11 is adapted to be excited consequent to the closure of the switch $S_1$ and a plunger 12 is adapted to be attracted downwards by the excitation of electromagnet to thereby rotate a shutter opening and closing lever 13 having a pin 13a slideably engaging a slot 12a in plunger 12 about a shaft 15 in the clockwise direction. Further included are a picture taking lens 16, a light receiving photosensitive element 17, and shutter blades 18 and 19. The shutter blades 18, 19 are formed with curved portions 18a, 18b and 19a, 19b and have elongated slots 18c, 19c therein. The shutter opening and closing lever 13 has an arm, on which is located a pin 13b, and another arm, on which the pin 13a is located. The pin 13b slideably engages the elongated slots 18c, 19c in the shutter blades 18, 19. Since the shutter opening and closing lever 13 is urged in the counter-clockwise direction by a spring 14, the pin 13b is normally positioned to the left in the elongated slots 18c, 19c, to thereby position the shutter blades 18, 19 in an overlapped relation as shown in FIG. 2. However, when the shutter opening and closing lever 13 is rotated in the clockwise direction due to the excitation of the electromagnet 11, and the attraction and depression at the plunger 12, then the pin 13b is moved to the right in the elongated slots 18c, 19c, so that the shutter blades 18, 19 are swung to form an exposure aperture in front of the picture taking lens 16, and a diaphragm light measuring aperture in front of the light receiving element 17, with curved portions 18a, 19a and 18b, 19b respectively. Further, a count or time switch S2 is adapted to be opened by a third pin 13c mounted on the lever 13, with the commencement of the clockwise rotation of shutter opening and closing lever 13.

The camera electric circuit is divided into an exposure control circuit 20 and a double exposure preventive circuit 21 adapted to disable or place the exposure control circuit in an inoperable condition. The exposure control circuit 20 includes the light receiving element 17; a transistor Tr1 for amplifying the photo-current obtained at or derived through the light receiving element 17; a condenser C1 charged with the output of the transistor Tr1; a switch S2; and a Schmitt circuit or switch consisting of transistors Tr2, Tr3; a transistor Tr4 for amplifying the output of the transistor Tr3 and the solenoid 11. A photo-electromotive force element such as an SBC (silicon blue cell) which serves as the light receiving element 17, a resistor R1 which functions to impress a voltage on the base of the transistor Tr1, and a diode D1 for nullifying the voltage across the terminals of the light receiving element 17 are connected to the base of the transistor Tr1. The switch S2 is connected across the condensor C1, and upon the opening of the switch S2, the condenser C1 begins to be charged. On the other hand, the transistor Tr2 has its base connected to the collector of the transistor Tr1. Thus, the moment a voltage across the terminals of the condenser C1 reaches a predetermined level, the transistor Tr2 is rendered conductive, thereby blocking the transistors Tr3, Tr4. The solenoid 11 is connected to the collector of the transistor Tr4, and is maintained excited only while the transistors Tr3, Tr4 are in conductive condition, and is de-energized simultaneously when the transistors Tr3, Tr4 are blocked. The resistors R2, R3 are used for stabilizing the operation of the Schmitt circuit.

The double exposure preventive circuit 21 consists of; switches S1, S3, S4, S5; a condenser C2; a discharge circuit consisting of resistors R4, R5 for dividing the voltage of a battery or cell E; and a semi-conductor control circuit consisting of a thyrister or SCR 22. The condenser C2 is connected by way of parallel connected switches S3, S4 across the resistor $R_6$, and constitutes a self discharging circuit with resistor R4 and switches S1, S5. Thus, by closing either one of switches S3 and S4, the condenser C2 is charged, and by closing both switches S1, S5, the condensor C2 is discharged. On the other hand, the SCR 22 is connected by way of the solenoid 11 to the base of the transistor Tr4, and its gate is connected by way of switches S1, S5 to the positive terminal of the condensor C2. The switch S1 is adapted to be closed by the depression of the release plate 9, while the switch S4 is a manually operable switch for use in multi-exposure picture taking and adapted to be freely opened and closed from the exterior of a camera.

The winding knob of the film transport portion A is connected to a gear 2 by way of shaft 23. A gear 3 meshing with the gear 2 is so designed as to rotate one turn during one turn of the winding knob 1. As shown, an insulating pin 24 is mounted on the gear 3. The moveable arms or pieces a, c of the switches S3, S5 are positioned within the locus of rotation of the insulating pin 24. Thus, the moveable pieces a, c are urged by means of the insulating pin 24, when the exposed film sheet 8 has been completely transported and discharged outside the camera, i.e., when the winding knob 1 is rotated one turn and hence the gear 3 is returned to its starting or initial position for rotation, the moveable piece $a$ of the switch S3 is separated from the fixed contact $b$, of switch S3 while the moveable piece $c$ contacts a fixed contact $d$ of switch S5. Stated otherwise, in the course of the exposed film sheet 8 being advanced or transported, the switch S3 is maintained in a closed condition, and the switch S5 is maintained in an open condition. The moment the film sheet 8 has been transported outside the camera, the switch S3 is transferred to an open condition, and the switch S5 is transferred to a closed condition.

Figure 3:
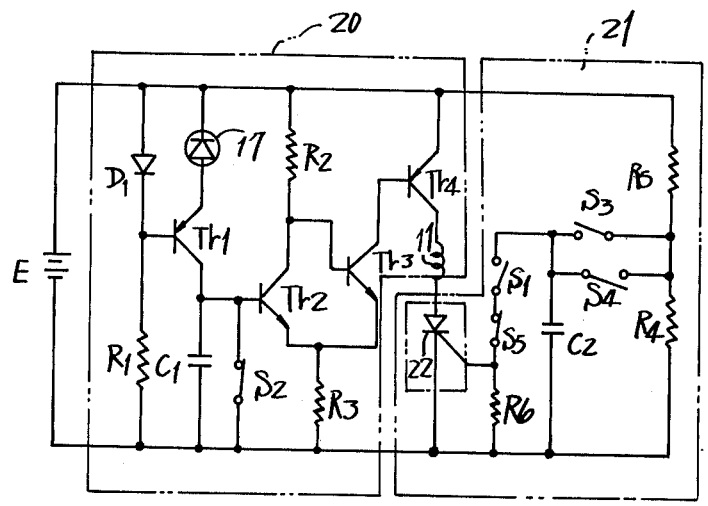
FIG. 3 is a diagram showing an electric circuit for controlling the shutter mechanism shown in FIG. 2.

In operation of the embodiment described above, when the exposed film has been completely transported and discharged outside the camera, the switches S1, S3 are in their open condition and the switches S2, S5 are in their closed condition, as shown in FIG. 3, while the condensor C2 has already been charged as will be described hereinafter. In addition, the shutter blades 18, 19, shutter opening and closing lever 13, and plunger 12 are maintained in the condition shown in FIG. 2 by means of spring 14. In this case, since a multi-exposure is not effected, the switch S4 is maintained in its open position.

If the release plate 9 is depressed in this condition, then the switch S1 is closed and the condensor C2 is discharged by way of the resistor R4, so that SCR 22 is rendered conductive, having impressed on its gate a voltage corresponding to that across both the terminals of the resistor R6. The transistors $Tr3$, $Tr4$ thus conduct, so that the solenoid 11 is excited, and the plunger 12 is attracted downwards. As a result, the shutter opening and closing lever 13 is pulled by the plunger 12 so as to rotate in the clockwise direction as shown in FIG. 2, thereby rotating the shutter blade 18 in the counter-clockwise direction by means of the pin $13b$ and the shutter blade 19 in the clockwise direction about the shaft 20, while the switch S2 is opened by the pin $13c$. The rotation of the shutter blades 18, 19 effect an exposure aperture as delineated by the curved portions $18a$, $19a$, whereupon the film sheet or frame is exposed, while the curved portions $18b$, $19b$ define a diaphragm aperture for light measurement, and the light receiving element 17 produces a photo-current of an amount commensurate with the brightness of the photographic object. The photo-current is amplified by means of the transistor $Tr1$ to thereby charge the condenser C1 with the opening of the switch S2.

When the voltage across the terminals of the condenser C1 reaches a predetermined level, the transistor $Tr2$ which has been blocked is rendered conductive, while the transistor $Tr3$, $Tr4$ are blocked, and so is SCR 22. Then, the solenoid 11 is de-energized and hence loses the force necessary to attract the plunger 12 so that the shutter opening and closing lever 13 rotates in the counter-clockwise direction about a shaft 15 under the action of the spring 14, thereby returning the shutter blades 18, 19 to their closed positions shown in FIG. 2, by means of pin $13b$, thus completing the exposure of the film frame or sheet. On the other hand, the rotation of the shutter opening and closing lever 13 causes the pin $13c$ to be retracted from its switch actuating condition, so that the switch S2 is again closed as shown in FIG. 2. Even if the switch S1 is closed in this condition, the condensor C2 remains discharged, so that SCR 22 is not rendered conductive. As a result, the solenoid 11 is not excited. Accordingly, even if the release plate 9 is depressed in this condition, an exposure may not be achieved.

Figure 4:
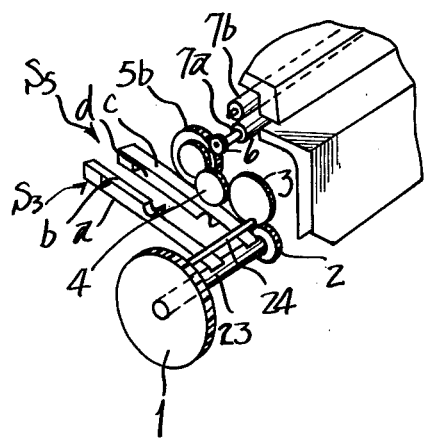
FIG. 4 is a perspective view of an essential part of the mechanism located in portion A shown in FIG. 1.

When the winding knob 1 is rotated so as to transport or advance a film sheet or frame outside the camera, the gear 3 is rotated and the insulating pin 24 is retracted from the position engaging the moveable contacts $a$, $c$, so that the switch S3 is closed and the switch S5 is opened. The condensor C2 is charged simultaneously with the closure of the switch S3. However, even if the switch S1 is closed, the switch S5 is opened, so that the condensor C2 is not discharged. Accordingly, the depression of the release plate 9 in the course of the transportation of a film in this embodiment will not effect exposure. Then, when the winding knob 1 is rotated one turn, an exposed film sheet is transported completely outside the camera. At this time, the insulating pin 24 on the gear 3 presses moveable pieces $a$, $c$ again, to thereby open the switch S3 and close the switch S5. At this time, all the members have been returned to their home or initial positions as shown in FIGS. 2 to 4. Thus, if the release plate 9 is depressed, then the aforesaid operation cycle is repeated.

In the present embodiment, if the switch S4 is closed, the condensor C2 is charged, even if the switch S3 is not closed by manipulating the winding knob 1. Accordingly, double exposure or multi-exposure operation may be accomplished, by closing the switch S4 and depressing the releasing plate 9 at least once again, without manipulating the winding knob 1, after the completion of exposure.

Description has been given thus far of one embodiment of the present invention. However, the present invention is by no means limited to the embodiment described and shown. Accordingly, various modifications and alterations are apparent to those skilled in the art of the arrangement of the shutter mechanism and the individual electric circuits, for instance, the semiconductor control circuit may be composed of transistors, in place of SCR 22. In addition, the present invention is applicable not only to a self-processing camera as described in the embodiment of the invention, but also to the general type electric shutter camera, in which a shutter is released due to the excitation of an electromagnet and film transportation is effected manually, after the completion of exposure.

I claim:

1. A camera comprising:
   a power source;
   a semi-conductor switching circuit transferable between relatively conductive and non-conductive states;
   an electromagnet connected to said power source in series with said semi-conductor switching circuit so as to be energized when said semi-conductor switching circuit is made conductive;
   a shutter opened in response to the energization of said electromagnet;
   manually operable means for transporting a film;
   means for generating an electric signal in response to the transportation of the film;
   a manually operable member;
   means for applying said electric signal to said semiconductor switching circuit to render the latter conductive, in response to the operation of said manually operable member; and means for permitting said electric signal to be applied to said semi-conductor switching circuit when the film is in a position where the transportation thereof has been completed.

2. A camera as set forth in claim 1, wherein said electric signal generating means includes:
capacitance means; and
first charging means for charging said capacitance means to generate a voltage there-across during the transportation of the film, said voltage defining said electric signal.

3. A camera as set forth in claim 2, wherein said electric signal applying means includes a normally opened first switch closed in response to the operation of said manual member and resistance means connected to said capacitance means in series with said first switch, said electric signal application permitting means includes a second switch connected to said capacitance means in series with said first switch and said resistance means, and said semi-conductor switching circuit includes a gate terminal connected to said resistance means.

4. A camera as set forth in claim 2, further comprising second charging means connected in parallel with said first charging means, said second charging means being manually operable to its operative position for charging said capacitance means.

5. A camera as set forth in claim 4, wherein said first charging means includes a first switch connected between said capacitance means and said power source and closed only during the transportation of the film, and said second charging means includes a second switch connected in parallel with said first switch between said capacitance means and said power source, said second switch being manually operable between a closed position and an opened position.

6. A camera as set forth in claim 1, further comprising means for biasing said shutter to its closed position, said electromagnet, when energized, operating said shutter to its opened position against the biasing force of said biasing means.

7. A camera as set forth in claim 6, further comprising means for interrupting the power supply from said power source to said semi-conductor switching circuit and said electromagnet after a lapse of time from the opening of said shutter, for making said semi-conductor switching circuit nonconductive and de-energizing said electromagnet.

8. A camera as set forth in claim 7, wherein said interrupting means includes:
photo-electric means for producing an output commensurate with the brightness of an object to be photographed;
capacitance means connected to said photo-electric means;
a switch connected to said photo-electric means in parallel with said capacitance means, said switch being normally closed for discharging said capacitance means and opened in response to the opening of said shutter for allowing said output of said photo-electric means to charge said capacitance means; and
a switching circuit for interrupting the power supply to said semi-conductor switching circuit and said electromagnet when a voltage which appears across said capacitance means reaches a predetermined level.

* * * * *